(No Model.)
A. M. LAWRENCE.
MEANS FOR GRAINING WOOD.
No. 535,704. Patented Mar. 12, 1895.
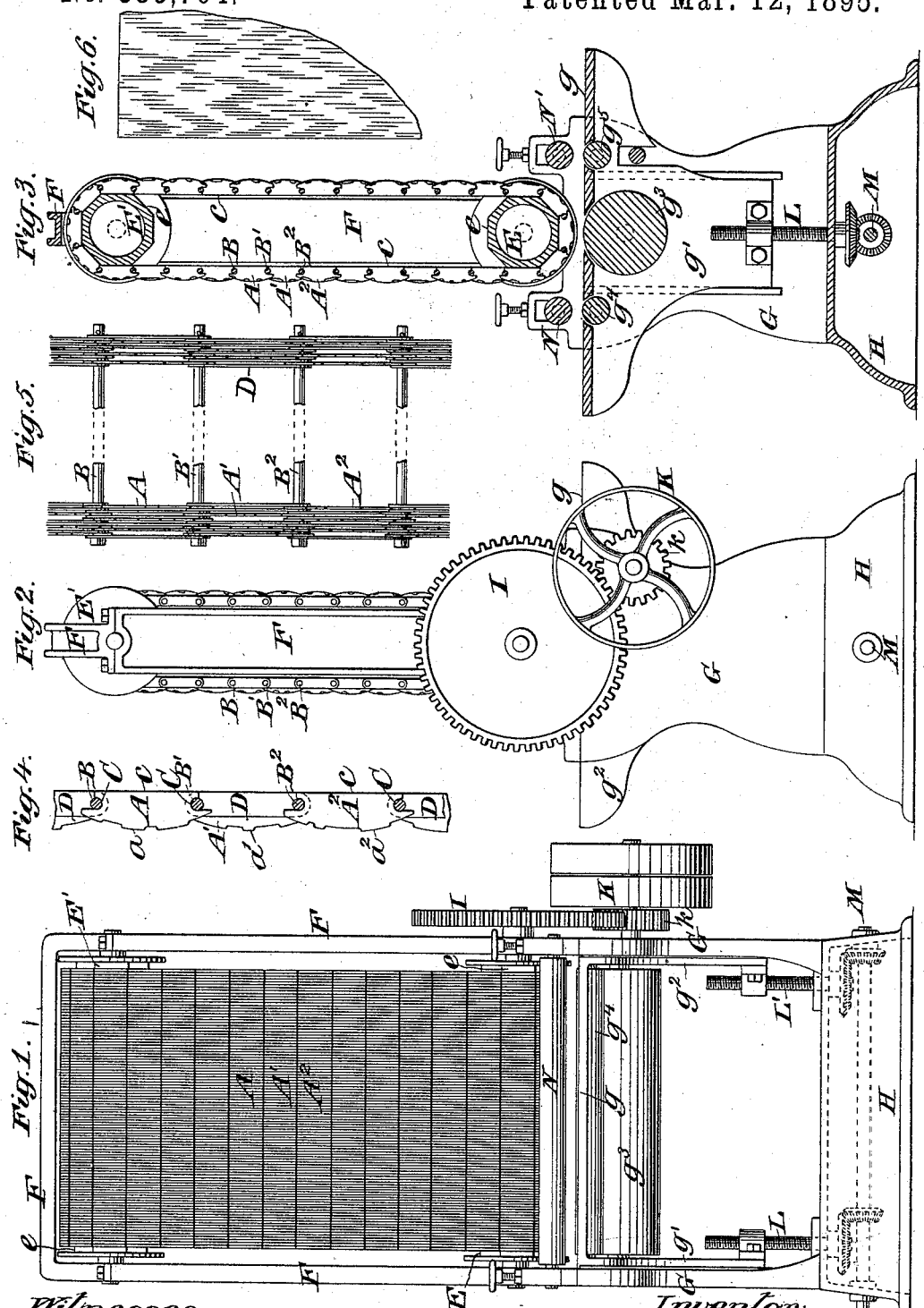

UNITED STATES PATENT OFFICE.

AUSTIN M. LAWRENCE, OF MONTAGUE, MASSACHUSETTS.

MEANS FOR GRAINING WOOD.

SPECIFICATION forming part of Letters Patent No. 535,704, dated March 12, 1895.

Application filed June 1, 1894. Serial No. 513,117. (No model.)

*To all whom it may concern:*

Be it known that I, AUSTIN M. LAWRENCE, of Montague, in the county of Franklin and State of Massachusetts, have invented a new and useful Improvement in Means for Graining Wood, of which the following is a specification.

My invention relates to an improvement in means for graining wood in which the surface of the wood to be grained is operated upon by a succession of indenting blades, interchangeably secured together in the form of an endless chain, mounted and actuated in such a manner as to follow continuously along the surface of the material to be grained.

A practical embodiment of my invention is represented in the accompanying drawings, in which—

Figure 1 represents the graining machine in front elevation. Fig. 2 is a view in side elevation. Fig. 3 is a view in vertical section on a plane from front to rear. Fig. 4 is a view in detail, showing in side elevation a portion of the chain of blades on an enlarged scale. Fig. 5 is a similar view in front elevation, and Fig. 6 represents a piece of material as it may appear, after having been operated upon by the machine.

The means for producing the impressions upon the surface of the material to be grained consist of banks of blades A, A', A$^2$, &c., connected together by bolts B, B', B$^2$, &c., so as to form an endless chain. The blades consist preferably of sheet steel, having their outer or operating edges provided with irregular indentations to produce teeth $a$, $a'$, $a^2$, &c., of varying lengths and depths. The blades may be either provided with perforations, extending transversely therethrough, for the reception of the bolts B, B', &c., or they may be provided with half sockets in their ends, as noted at C, Fig. 4, to permit them to be removed from the bolts B, B', &c., without dismembering the chain—or some of the blades may be provided with perforations through them and other blades provided with half sockets.

In my preferred form, shown in Fig. 5, I provide spacing blanks D with perforations through them for the reception of the bolts B, B', &c., and construct the blades A, A', &c., with half sockets C, so that they may be removed or interchanged at pleasure. To accomplish this, I remove, temporarily, one or more of the bolts B, B' and, while holding the blades clamped together in their operative position, insert in the place of the bolts B, B' longer bolts or rods, so as to permit the blades and their spacing blanks D to be slid apart from one another, when, by turning one of the blades with its half sockets in an oblique direction with respect to the normal position of the blade, it may be slipped past the bolt and removed and another put in its place, either for purposes of repairing the indenting face of the blade or for the purpose of changing the particular pattern of grain, as may be desired. When such blades have been removed or interchanged, the temporary longer bolts may be removed and the regular bolts B, B' again inserted and the blades keyed thereon in any suitable manner.

The endless chain, composed of banks of graining blades, is supported upon rollers or drums E, E'. In the present instance the drum E is the lower one and E' is located vertically above it and mounted in a suitable supporting frame F uprising from a bed frame G, which may be supported upon a pedestal H of any well known or approved form. The drums E, E' are made polygonal on their peripheries, the widths of the sides $e$ corresponding to the lengths of the straight inner edges $c$ of the blades and the outer or operating edges of the blades are made on a curve such that when the several banks of blades are engaged with the periphery of the drum E, the successive outer curved edges of the blades will fall in a circular line, described from the axis of the drum. While this circular form of the operating edges of the blades is preferred, it is not necessary to the operation of my chain of blades that it should be so arranged and I do not wish it to be understood that I limit myself solely to such form.

The chain of blades is actuated by means of the lower drum E which has secured to its shaft a drive gear wheel I, in gear with a pinion $k$ fixed to rotate with a band pulley K which is supposed to be driven from a suitable source of power, not shown.

The material to be grained is fed along underneath the drum E upon a table $g$ which table is made vertically adjustable by means of a pair of adjusting screws L, L' engaged with the end supports $g'$ $g^2$ of the table and operated by means of a shaft M geared with the heads of the screws L, L'. The table $g$ is also preferably provided with a central bearing roller $g^3$ and with rollers $g^4$, $g^5$ for the purpose of reducing the friction of the material on the table as it is fed along by the action of the graining blades on it. The adjustment of the table toward and away from the operating edges of the graining blades provides for introducing different thicknesses of material and, for the purpose of holding the material squarely to its work and for straightening material which may be warped, I provide adjustable pressure rollers N, N' mounted in the bed frame G over the rollers $g^4$, $g^5$.

It is obvious that the ends of the blades A, A', &c., may be projected a greater or less distance beyond the points where the bolts B, B', &c., engage them and that when such projections are made upon the curve which the edges of the blades assume when passing around the drum E, they will still fall in the plane of the graining edges of the adjacent bank of blades.

It is further obvious that the operating edges of the graining blades might be inked or supplied with any printing substance in any well known manner for the purpose of printing the surface of the material passing underneath them, instead of indenting it, or that they might both indent and print it, as found expedient.

What I claim is—

1. In a graining machine, an endless chain composed of connected banks of separate blades, one or more of the blades being removably engaged with the cross bolts of the chain to permit the removal and insertion of the blade or blades without dis-membering the chain, substantially as set forth.

2. In a graining machine, an endless chain composed of connected banks of separate independently removable blades and interposed spacing blanks connecting the cross bolts of the chain, substantially as set forth.

3. The combination with a driving drum having a polygonal periphery, of a chain composed of connected banks of blades, the operating edges of the blades having a curve such that the edges of successive blades will fall in a circular line when the inner edges of the blades rest in contact with the polygonal surface of the drum, substantially as set forth.

4. In a graining machine, an endless chain of connected banks of separate blades, one or more of the blades being provided with half sockets in their ends to engage successive cross bolts of the chain and having their operating edges curved and projected over the said cross bolts into the field of the adjacent banks of blades, substantially as set forth.

AUSTIN M. LAWRENCE.

Witnesses:
A. HARVEY,
A. TROWSE.